United States Patent Office 3,730,687
Patented May 1, 1973

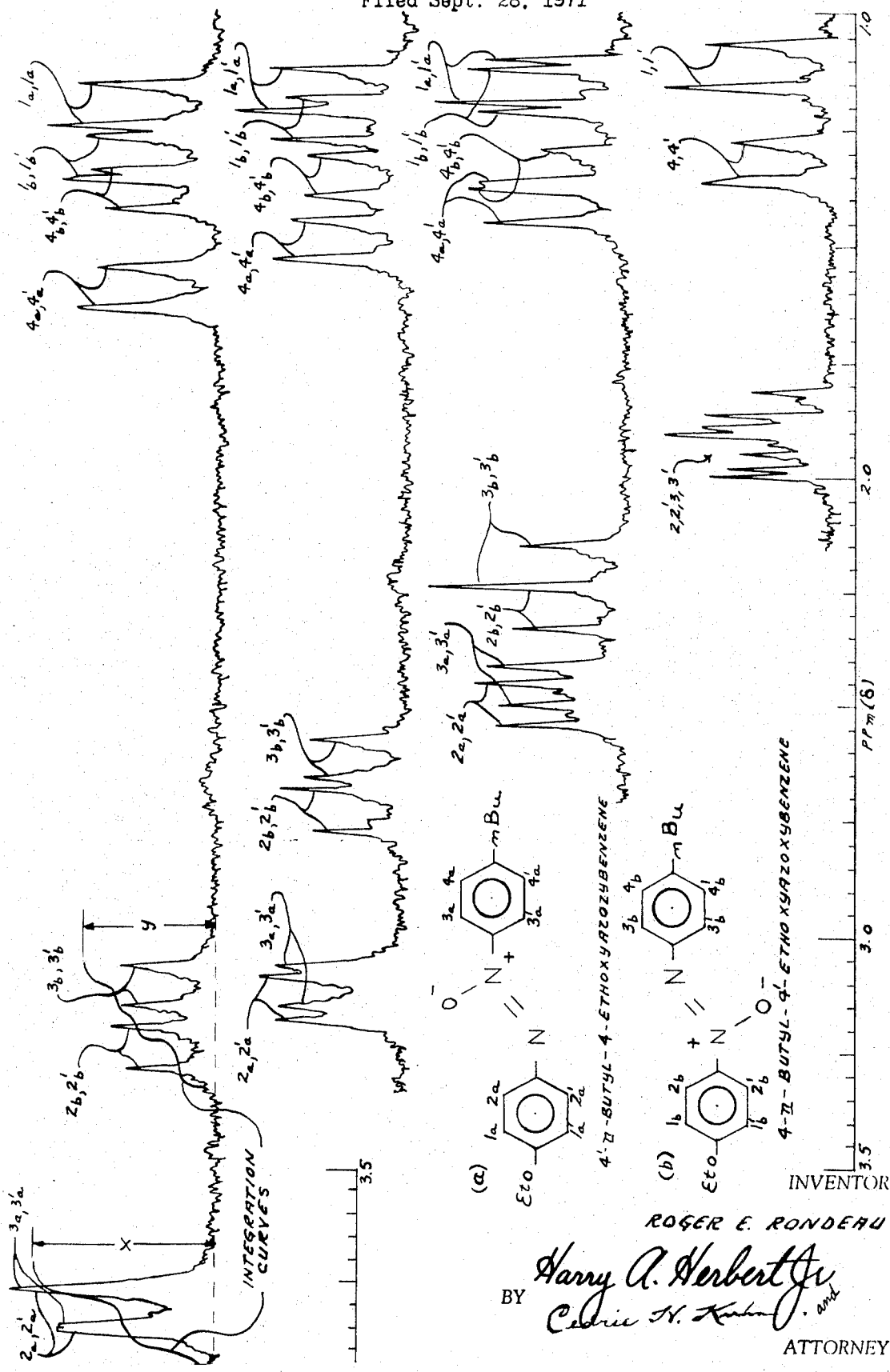

3,730,687
SPECTRAL SEPARATION AND ANALYSIS OF ISOMERIC AZOXYBENZENES
Roger E. Rondeau, Dayton, Ohio, assignor to the United States of America as represented by the Secretary of the Air Force
Filed Sept. 28, 1971, Ser. No. 184,386
Int. Cl. G01n 27/78
U.S. Cl. 23—230 R
10 Claims

ABSTRACT OF THE DISCLOSURE

A process is provided whereby tris (1,1,1,2,2,3,3-heptafluoro-7,7-dimethyl - 4,6 - octanedionate)europium(III) is added to a sample of a mixture of isomeric azoxybenzenes after which the sample is subjected to nuclear magnetic resonance. The spectrum obtained makes it possible to identify each isomer as well as to determine their relative amounts in the mixture.

FIELD OF THE INVENTION

This invention relates to the spectral analysis of isomeric azoxybenzenes by nuclear magnetic resonance (NMR). In one aspect it relates to a process whereby the relative amounts of individual isomers in an isomeric mixture can be determined.

BACKGROUND OF THE INVENTION

NMR spectroscopy has been employed for many years in the identification of compounds by comparing the spectra of known compounds with those of the compounds to be analyzed. The techniques used in this method of spectral analysis are described in the literature, and NMR spectrometers are commercially available. For a discussion of the theory of nuclear magnetic resonance and a description of the basic components of an NMR spectrometer and its operation, reference may be made to Van Nostrand's Scientific Encyclopedia, 4th ed., D. Van Nostrand Company, Inc., Princeton, N.J. Briefly, in the operation of a spectrometer, a tube containing a sample to be analyzed is positioned between the pole faces of a direct current electromagnet whose gap can be verified. An oscillating radio frequency field is imposed at right angles to the magnetic field. A separate radio frequency coil in the form of a few turns of wire wound tightly around the sample tube serves as the receiver coil to pick up the resonant signal from the sample. When nuclear transitions are induced, energy is absorbed from the receiver coil, causing the voltage across the receiver coil to drop. After this change is amplified and detected, the resulting direct current voltage is placed on an oscilloscope. The NMR spectrum, a pattern of intensity as a function of frequency, is thereby produced. An interpretation of the spectrum makes it possible to determine the nuclei present in a molecule and their relationship to one another.

From the commencement of NMR spectroscopy in the late 1940's, the effects of paramagnetism on nuclear magnetic resonance have been the subject of considerable study. The object of the study has been the development of so-called shift reagents which, when added to a sample of a compound subjected to NMR, will cause frequency shifts that desirably will result in a high resolution spectrum without objectionabl peak broadening. While a certain degree of success has been achieved, the utility of the prior art shift reagents has been limited to specific classes of compounds with which they form adducts that have a relatively high solubility in nonalcoholic solutions.

Several unsymmetrically substituted trans-azoxybenzenes are nematic liquid crystals that exhibit dynamic scattering when subjected to an electric field. An azoxybenzene is produced by the oxidation of the corresponding azo compound, the product obtained being a pair of isomers differing structurally only in the relative position of the oxygen atom. Because of their structural similarity and their nearly identical physical properties, the isomers are extremely difficult to separate. And even after physical separation, there is still the problem of identifying the isomers. In the past NMR spectroscopy has been of little assistance in identifying the isomers because the spectra obtained, even when using prior art shift reagents, have been cluttered with overlapping peaks, thereby making it impossible to interpret the spectra with any degree of certainty or accuracy.

It is an object of this invention, therefore, to provide a process for the spectral analysis of a mixture of isomeric azoxybenzenes that makes it possible to identify each isomer in the mixture.

Another object of the invention is to provide a process for the spectral analysis of a mixture of isomeric azoxybenzenes whereby the relative amount of each isomer in the mixture can be determined.

Other objects and advantages of the invention will become apparent to those skilled in the art upon consideration of the accompanying disclosure and the drawing which shows spectra of a mixture of isomeric azoxybenzenes with varying amounts of the shift reagent used in the practice of the present invention, and without any shift reagent.

SUMMARY OF THE INVENTION

Broadly speaking, the present invention resides in a process for the spectral analysis of isomeric azoxybenzenes by nuclear magnetic resonance which comprises the step of mixing the isomeric azoxybenzenes with tris-(1,1,1,2,2,3,3-heptafluoro-7,7-dimethyl - 4,6 - octanedionato)europium(III) [Eu(fod)$_3$].

In a more specific embodiment, the process of this invention comprises the steps of (1) preparing a solution of azoxybenzenes and Eu(fod)$_3$, the solution containing a reference compound; and (2) recording the NMR spectrum of the solution. In another embodiment, the invention resides in a mixture of adducts of azoxybenzenes and Eu(fod)$_3$.

Isomeric azoxybenzenes that can be analyzed in accordance with the process of this invention can be represented by the following structural formula:

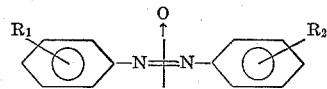

wherein $R_1$ and $R_2$ are radicals individually selected from the group consisting of —H, —$C_nH_{2n+1}$ (alkyl), —$NO_2$(nitro), —C≡N(cyano), Cl, F, Br, I, —$OCO_2R$ (carbonate), —OCOR (ester), and —OR (alkoxide); R is an alkyl group; and $n$ is a whole number. The alkyl groups can be the same or different, and the number of carbon atoms in each alkyl group can vary within wide limits. Actually, insofar as determining the relative amount of each isomer in a mixture is concerned, the number of carbon atoms in the alkyl groups is immaterial. Also, the value of $n$, which corresponds to the number of carbon atoms in the —$C_nH_{2n+1}$ radical, can fall within a broad range. However, the number of the carbon atoms in each of the groups and the value of $n$ are usually in the range of 1 to 15, inclusive, and more often in the range of 1 to 6, inclusive.

Examples of isomeric azoxybenzenes corresponding to the above formula include 3'-methylazoxybenzene and 3-methylazoxybenzene; 4'-n-hexylazoxybenzene and 4 - n-hexylazoxybenzene; 4'-methoxyazoxybenzene and 4-methoxyazoxybenzene; 4'-butoxyazoxybenzene and 4 - butoxyazoxybenzene; 4'-chloroazoxybenzene and 4-chloroazoxybenzene; 4'-n-butyl-4-chloroazoxybenzene and 4-n-butyl-4'-chloroazoxybenzene; 4' - bromo-4-n-hexylazoxybenzene and 4-bromo-4'-n-hexylazoxybenzene; 4'-acetoxy-4-methoxyazoxybenzene and 4-acetoxy-4'-methoxyazoxybenzene; 4'-methylcarbonato-4-n-hexylazoxybenzene and 4-methylcarbonato - 4' - n - hexylazoxybenzene; 4'-nitroazoxybenzene and 4-nitroazoxybenzene; 4'-caprooxy-4-n-propoxyazoxybenzene and 4 - caprooxy-4'-propoxyazoxybenzene; 4'-cyanoazoxybenzene and 4 - cyanoazoxybenzene; 2'-nitro-2-ethoxyazoxybenzene and 2-nitro-2'-ethoxyazoxybenzene; and the like. Isomeric azoxybenzenes are commercially available products that are prepared by the oxidation of azobenzenes according to well known procedures.

Conditions for resonance are expressed in terms of a difference (chemical shift) between the field necessary for resonance in the sample and in an arbitrarily chosen reference material. Thus, samples to be subjected to nuclear magnetic resonance conventionally contain a reference compound having only a single resonance line, which serves to locate the resonant frequency of a sample in a magnetic field. Examples of suitable reference compounds include tetramethyl silane (TMS), chloroform, cyclohexane and benzene. The reference compound can be added to the azoxybenzenes to be analyzed, to the Eu(fod)$_3$, or to the solution or solutions containing these materials.

In general, solvents suitable for use are compounds in which both the isomeric azoxybenzenes and Eu(fod)$_3$ are soluble. Also, the compounds useful as solvents are those that either do not absorb, or if they do absorb, the absorption occurs in a region that does not interfere with the sample spectrum. Examples of suitable solvents include carbon tetrachloride, chloroform, deuterated chloroform, methylene chloride, deuterated methylene chloride, benzene, deuterated benzene and the like.

In preparing the sample for analysis, the Eu(fod)$_3$ can be in solution in the solvent in which case the mixture of azoxybenzene isomers is added to the solution. Alternatively, the mixture of isomers can be in solution, and in this case the Eu(fod)$_3$ is added to the solution. Also, the mixture of isomers and the Eu(fod)$_3$ can be in separate solutions in which event the two solutions are mixed. The reference material can be added in any manner so long as it is present in the sample solution.

Generally, the sample solution subjected to NMR contains about 0.01 to 0.5 mol of Eu(fod)$_3$ per 1000 milliliters of the solvent. The amount of the reference material is usually in the range of about 0.01 to 3 weight percent, based on the weight of the solution. In a preferred procedure for practicing the process of this invention, a solution containing 0.1 to 3 mols of the mixture of azoxybenzene isomers per 1000 milliliters of solvent is initially prepared. After addition of the reference compound, the solution is subjected to nuclear magnetic resonance and the spectrum is recorded. Thereafter, the Eu(fod)$_3$ is added to the solution in increments, and after the addition of each increment the NMR spectra is recorded. This procedure is followed until a clarified spectrum is obtained that can be easily interpreted.

Upon mixing the isomeric azoxybenzenes and the Eu(fod)$_3$, an adduct or complex of the two materials is formed as a result of the reaction between Eu ions and oxygen atoms. Because of the paramagnetism of the Eu, the protons of the chelated azoxybenzene isomers experience large spectral shifts. The Eu-proton interactions operate through space and the internuclear distance between a proton and Eu determines the magnitude of the spectral shift for that proton. Since the Eu(fod)$_3$ forms complexes with both isomers in the isomeric mixture, it is thereby possible to assign protons with certainty to specific isomers from the observed proton shifts occurring in the NMR spectra of the complexes. Also, by determining the relative absorption of corresponding protons of the two isomers, the percentage of each isomer in the mixture can be readily obtained. Thus, the identity and relative quantity of each isomer can be determined without resorting to physical separation. In the past it has been possible to analyze such mixtures only by following complicated and expensive procedures.

A better understanding of the invention can be obtained by considering the following illustrative examples which are not intended, however, to be unduly limitative of the invention.

EXAMPLE I

An experiment was conducted in which NMR spectra were obtained at 60 mHz. with solutions containing 10$^{-4}$ mol of a mixture of 4'-n-butyl-4-ethoxyazoxybenzene and 4-n-butyl-4'-ethoxyazoxybenzene in 0.5 ml. of carbon tetrachloride. The solution was added to a sample tube of a Varian HA–60–IL spectrometer after which two drops of TMS was added as the reference material.

The sample tube containing the above-described solution was placed in the spectrometer and its NMR spectrum was obtained and recorded. The sample tube was then removed from the spectrometer, and its contents was poured into a small beaker containing 10 mg. of Eu(fod)$_3$. The resulting second solution is then returned to the sample tube, and its NMR spectrum was obtained and recorded. This same procedure is repeated two more times with 10 mg. of additional Eu(fod)$_3$ being added each time. Thus, four spectra were obtained, one of the isomeric mixture and three of the isomeric mixture containing 10, 20, and 30 mg. of Eu(fod)$_3$, respectively.

By proceeding in accordance with the stepwise procedure as described above, sufficient spectral shifts were obtained so that it was possible to spectrally separate the isomers. Traces of the aromatic region of the four spectra obtained are shown in the drawing. The formulas for the two isomers are also shown in the drawing with the corresponding protons being similarly numbered. The subscripts "$a$" and "$b$" are used with the numbers so as to indicate the isomer, i.e., isomer ($a$) or isomer ($b$), with which each proton is associated. The absorption peaks shown in the several spectra have been labelled to correspond to those shown in the structural formulas.

The lower spectrum in the drawing, i.e., that of the solution containing no Eu(fod)$_3$, has the appearance of a spectrum of a single compound. While the absorption peaks attributable to the several protons appear in the spectrum, there is no indication that the protons are associated with more than one compound.

The second spectrum from the bottom is for the solution containing 10 mg. of Eu(fod)$_3$. As a result of the addition of this compound, all peaks are shifted downfield, i.e., to the left. The extent of the shifting depends on the proximity of the shifted proton to the europium which interacts with the azoxy oxygen in both isomers. For example, it is seen that the $1_b$ and $1_b'$ protons are closer to the Eu than the $1_a$ and $1_a'$ protons. As a result the $1_b$ and $1_b'$ protons are shifted downfield more than the $1_a$ and $1_a'$ protons thereby causing a split of the original doublet (1,1') shown in the bottom spectrum. The other protons shift downfield in a similar manner, those nearest to the Eu undergoing a greater shift. It is noted that the $2_a$, $2_a'$, $3_a$ and $3_a'$ of isomer ($a$) have shifted more than the corresponding protons of isomer ($b$). This is due to resonance effects resulting in greater basicity of isomer ($a$).

The third spectrum from the bottom is that of the solution containing 20 mg. of Eu(fod)$_3$. It is seen that as a result of the addition of the greater amount of Eu(fod)$_3$ the shift separations increased.

The fourth spectrum from the bottom is that of the solution containing 30 mg. of Eu(fod)$_3$. The additional Eu(fod)$_3$ caused further increases in the downfield shifting of the protons. By comparing the top three spectra, the shifts of the isomeric sets of protons can be readily followed.

Traces of the integration curves for absorption peaks of the 2,2′ and 3,3′ protons of isomer (a) and of isomer (b) were also determined, as shown in the top spectrum, by the spectrometer. The percent of isomer (a) in the mixture is equal to $$\frac{x}{x+y}$$

where $x$ and $y$ are values representing the heights of the respective curves above the base line. The particular mixture analyzed contained 59 weight percent of isomer (a) and 41 weight percent of isomer (b).

EXAMPLE II

A series of experiments were conducted in which the following isomeric mixture were analyzed by NMR:

(1) 4′-methoxyazoxybenzene
    4-methoxyazoxybenzene
(2) 4′-chloroazoxybenzene
    4-chloroazoxybenzene
(3) 4′-methylazoxybenzene
    4-methylazoxybenzene
(4) 4′-acetoxy-4-methoxyazoxybenzene
    4-acetoxy-4′-methoxyazoxybenzene The procedure described in Example I was followed. The isomers were spectrally separated and the relative amounts of the isomers in the mixtures were determined.

From the data it is seen that the process of this invention makes it possible to spectrally separate and identify the isomers of azoxybenzenes. In the usual practice of the invention, the Eu(fod)$_3$ is added to the mixture of isomers in increments of increasing amounts and the several spectra obtained are compared. However, it is to be understood that it is not intended to limit the invention to the addition of any particular number of increments of Eu(fod)$_3$. For example, it is within the scope of the invention to add initially an amount of Eu(fod)$_3$ sufficient to completely separate the resonances (spectral absorptions). By then obtaining the integral spectrum, the relative quantity of each isomer in the mixture can be determined.

As will be evident to those skilled in the art, various modifications of this invention can be made in the light of the foregoing disclosure without departing from the spirit or scope of the invention.

I claim:

1. A process for the spectral analysis of isomeric azoxybenzenes by nuclear magnetic resonance which comprises mixing said isomeric azoxybenzenes with tris-(1,1,1,2,2,3,3-heptafluoro - 7,7 - dimethyl - 4,6 - octanedionato)europium(III), and recording a nuclear magnetic resonance spectrum of the resulting mixture.

2. The process according to claim 1 in which said isomeric azoxybenzenes have the following structural formula:

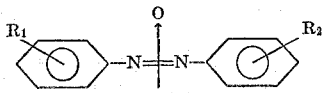

wherein $R_1$ and $R_2$ are radicals individually selected from the group consisting of —H, —C$_n$H$_{2n+1}$, —NO$_2$, —C≡N, Cl, Br, F, I, —OCO$_2$R, —OCOR; R is an alkyl group; and $n$ is a whole number.

3. The process according to claim 2 in which said isomeric azoxybenzenes are mixed with said tris(1,1,1,2,2,3,3-heptafluoro-7,7-dimethyl - 4,6 - octanedionato)europium(III) in a solvent, and a nuclear magnetic resonance spectrum of the resulting solution is recorded.

4. The process according to claim 3 in which said solution contains a reference compound.

5. The process according to claim 2 in which said isomeric azoxybenzenes are mixed with said tris(1,1,1,2,2,3,3-heptafluoro-7,7-dimethyl - 4,6 - octanedionato)europium(III) by adding the latter compound in increments to a solution of said isomeric azoxybenzenes containing a reference compound and a nuclear magnetic resonance spectrum of the solution after each incremental addition is recorded.

6. The process according to claim 3 in which said solution contains about 0.1 to 3 mols of isomeric azoxybenzenes per 1000 milliliters of solvent and about 0.01 to 0.05 mol of tris(1,1,1,2,2,3,3-heptafluoro-7,7-dimethyl-4,6-octanedionato)europium(III) per 1000 milliliters of solvent.

7. The process according to claim 4 in which the said solution contains about 0.01 to 3 weight percent of said reference compound.

8. The process according to claim 6 in which said solvent is selected from the group consisting of carbon tetrachloride, chloroform, deuterated chloroform, methylene chloride, deuterated methylene chloride, benzene and deuterated benzene.

9. The process according to claim 7 in which said solvent is selected from the group consisting of tetramethyl silane, chloroform, cyclohexane and benzene.

10. The process according to claim 3 in which two integral spectra are recorded, one for each of two sets of two corresponding protons for each azoxybenzene isomer, one set of two corresponding protons being on each ring of the isomers; and the height of each integral spectra above a reference line is measured, each measured height divided by their sum representing the percentage of each isomer of the isomeric azoxybenzenes.

References Cited

C. R. Springer et al.: Rare Earth Chelates of 1,1,1,2,2,3,3-heptafluoro - 7,7 - dimethyl-9,6-octanedione, Inorg. Chem., 6(6), June 1967, pp. 1105–1110.

MICHAEL J. LYNCH, Primary Examiner

U.S. Cl. X.R.

23—230 L C, 324—0.5 R